(12) United States Patent
Tucker et al.

(10) Patent No.: US 12,174,462 B2
(45) Date of Patent: Dec. 24, 2024

(54) COSMETIC FUNCTIONAL CONTACT LENS

(71) Applicant: Alcon Inc., Fribourg (CH)

(72) Inventors: Robert Carey Tucker, Johns Creek, GA (US); John Dallas Pruitt, Suwanee, GA (US)

(73) Assignee: Alcon Inc., Fribourg (CH)

( * ) Notice: Subject to any disclaimer, the term of this patent is extended or adjusted under 35 U.S.C. 154(b) by 475 days.

(21) Appl. No.: 17/644,838

(22) Filed: Dec. 17, 2021

(65) Prior Publication Data

US 2022/0197056 A1 Jun. 23, 2022

Related U.S. Application Data

(60) Provisional application No. 63/128,444, filed on Dec. 21, 2020.

(51) Int. Cl.
G02C 7/04 (2006.01)
G02C 11/00 (2006.01)
G08C 17/00 (2006.01)

(52) U.S. Cl.
CPC .............. G02C 7/046 (2013.01); G02C 11/10 (2013.01); *G08C 17/00* (2013.01)

(58) Field of Classification Search
CPC ......... G02C 7/046; G02C 11/10; G08C 17/00
USPC .................................................... 351/159.24
See application file for complete search history.

(56) References Cited

U.S. PATENT DOCUMENTS

| | | |
|---|---|---|
| 3,536,386 A | 10/1970 | Spivack |
| 4,444,711 A | 4/1984 | Schad |
| 4,460,534 A | 7/1984 | Boehm et al. |
| 4,582,402 A | 4/1986 | Knapp |
| 4,704,017 A | 11/1987 | Knapp |
| 5,034,166 A | 7/1991 | Rawlings et al. |
| 5,843,346 A | 12/1998 | Morrill |
| 5,894,002 A | 4/1999 | Boneberger et al. |
| 7,490,936 B2 | 2/2009 | Blum et al. |
| 7,550,519 B2 | 6/2009 | Phelan |
| 8,154,804 B2 | 4/2012 | McGinn et al. |
| 8,446,341 B2 | 5/2013 | Amirparviz et al. |
| 8,740,996 B2 | 6/2014 | Burguiere et al. |
| 8,985,763 B1 | 3/2015 | Etzkorn et al. |
| 9,050,185 B2 | 6/2015 | Pugh et al. |
| 9,176,332 B1 | 11/2015 | Etzkorn et al. |
| 9,320,460 B2 | 4/2016 | Liu et al. |

(Continued)

FOREIGN PATENT DOCUMENTS

CN 103935057 A 7/2014

*Primary Examiner* — William R Alexander
(74) *Attorney, Agent, or Firm* — Sheng-Hsin Hu

(57) ABSTRACT

The invention is directed to a cosmetic functional contact lens having a pupil section, a generally annular iris section surrounding the pupil section for detecting at least one target analyte or physical attribute, comprising:
- a substrate for supporting electronic components and providing structural support for the functional contact lens;
- at least one sensing element disposed on the substrate for sensing the at least one target analyte or physical attribute and undergoing a physical change representing a sensed signal;
- an antenna disposed on the substrate for transmitting the sensed signal to an external device, the antenna being coupled to the at least one sensing element;
- a colored, printed, opaque, intermittent cosmetic pattern to mask the embedded electronic components.

15 Claims, 8 Drawing Sheets

(56) References Cited

U.S. PATENT DOCUMENTS

| | | | |
|---|---|---|---|
| 9,523,865 B2 | 12/2016 | Pletcher et al. | |
| 9,696,564 B1 | 7/2017 | Etzkorn et al. | |
| 2001/0050753 A1 | 12/2001 | Tucker | |
| 2003/0184710 A1 | 2/2003 | Tucker | |
| 2003/0085934 A1 | 5/2003 | Tucker | |
| 2003/0119943 A1 | 6/2003 | Tucker | |
| 2012/0026459 A1* | 2/2012 | Tucker | G02C 7/046 264/1.7 |
| 2014/0000101 A1 | 1/2014 | Pugh et al. | |
| 2015/0226982 A1* | 8/2015 | Tucker | G02C 7/046 351/159.3 |
| 2016/0091737 A1 | 3/2016 | Kim et al. | |
| 2016/0187672 A1* | 6/2016 | Tucker | G02C 7/046 351/159.3 |
| 2017/0042480 A1 | 2/2017 | Gandhi et al. | |
| 2018/0143454 A1 | 5/2018 | Humphreys et al. | |
| 2018/0173008 A1* | 6/2018 | Flitsch | G02C 7/101 |
| 2019/0250429 A1* | 8/2019 | Flitsch | G02C 7/046 |
| 2021/0141243 A1* | 5/2021 | Flitsch | B29D 11/00923 |
| 2021/0343033 A1* | 11/2021 | Bhat | G06F 3/013 |

\* cited by examiner

COSMETIC FUNCTIONAL CONTACT LENS

The present invention generally relates to a contact lens with a cosmetic pattern around the optic zone to mask the embedded electronic components of a functional contact lens to create a more natural appearance.

BACKGROUND OF THE INVENTION

Contact lenses as a minimally invasive platform for diagnostics and drug delivery have emerged in recent years. Recently electronic components have been inserted into contact lenses for analyzing the glucose composition of tears as a surrogate for blood glucose monitoring and for the diagnosis of glaucoma by measuring intraocular pressure. However, the eye offers a wider diagnostic potential as a sensing site and therefore contact lens sensors have the potential to improve the diagnosis and treatment of many diseases and conditions. With advances in polymer synthesis, electronics and micro/nanofabrication, contact lens sensors can be produced to quantify the concentrations of many biomolecules in ocular fluids. Non- or minimally invasive contact lens sensors can be used directly in a clinical or point-of-care setting to monitor a disease state continuously. For example, to develop an accommodating focus contact lens and a glucose monitoring contact lens have been planned. The developed contact lens consists of a wireless chip and a miniaturized glucose sensor. A tiny pinhole in the lens allows for tear fluid to seep into the sensor to measure blood sugar levels. Both of the sensors are embedded between two soft layers of lens material. There is a wireless antenna inside of the contact that is thinner than a human's hair, which will act as a controller to communicate information to the wireless device. The controller will gather, read, and analyze data that will be sent to the external device via the antenna. Power will be drawn from the device which will communicate data via the wireless technology RFID. The prototypes being tested can generate a reading once per second. Other patent examples have been describing inserting electronics into ophthalmic devices. Undoubtedly, more products will follow as the technology becomes mature. Any contact lenses with sensors or electronic components describe the functionality of the contact lens, but do not describe making the system aesthetically pleasing One problem with these embedded electronic components of the functional contact lens is their cosmetic appeal. They do not look natural on eye. Therefore, there is a need for improving a functional contact lens.

SUMMARY OF THE INVENTION

The invention provides a cosmetic functional contact lens having a pupil section, a generally annular iris section surrounding the pupil section for detecting at least one target analyte or physical attribute, comprising:
- a substrate for supporting electronic components and providing structural support for the functional contact lens;
- at least one sensing element disposed on the substrate for sensing the at least one target analyte or physical attribute;
- at least one electronic component selected from a group consisting of an antenna, a power supply, a control circuit, a microprocessor, a diode, an actuator and combinations thereof;
- a colored, printed, opaque, intermittent cosmetic pattern to mask the embedded electronic components, wherein the cosmetic pattern comprising a limbal ring pattern of a first color, a starburst pattern of a second color, wherein the first color and the second color are different or same, wherein limbal ring pattern and the starburst pattern have a substantially identical outer diameter wherein the limbal ring pattern, the starburst pattern are concentric with the center of the function contact lens.

The invention will become apparent from the following description of the preferred embodiments taken in conjunction with the following drawings. As would be obvious to one skilled in the art, many variations and modifications of the invention may be affected without departing from the spirit and scope of the novel concepts of the disclosure.

DETAILED DESCRIPTION OF THE PREFERRED EMBODIMENTS

Figure 1:
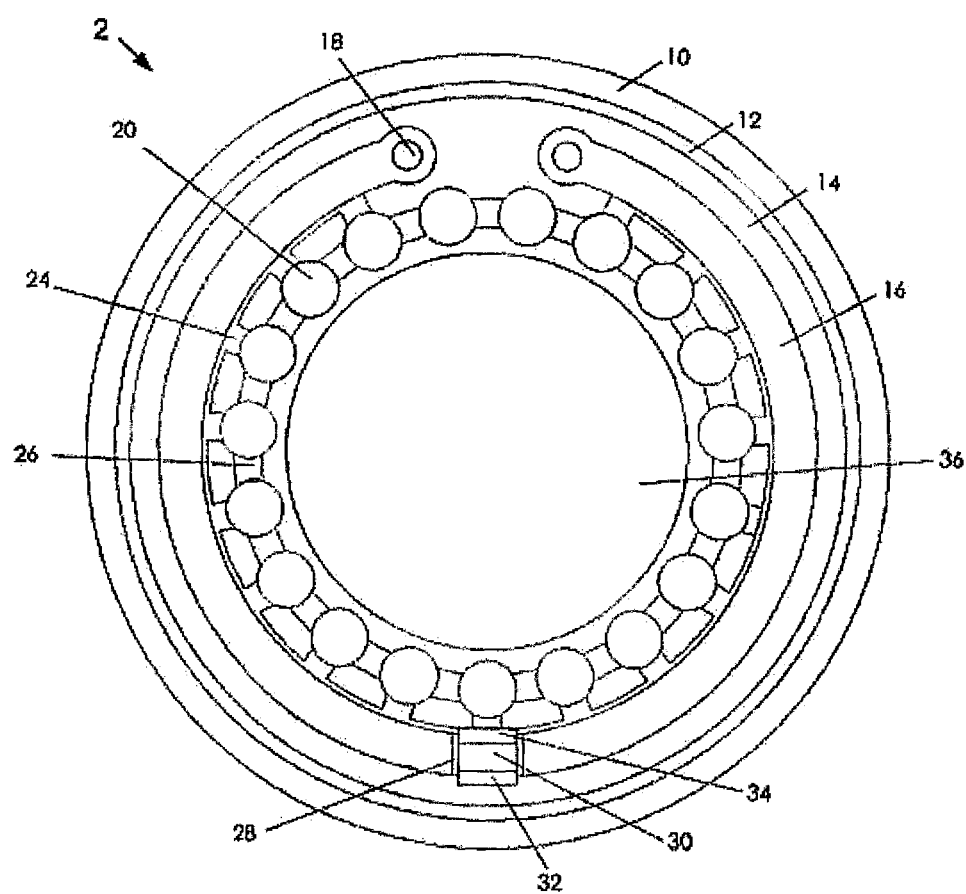
FIG. 1 illustrates a top view of an example embodiment of an annular Functional Contact Lens (FCL)

Reference now will be made in detail to the embodiments of the invention. It will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents. Other objects, features and aspects of the present invention are disclosed in or are obvious from the following detailed description. It is to be understood by one of ordinary skill in the art that the present discussion is a description of exemplary embodiments only, and is not intended as limiting the broader aspects of the present invention.

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well known and commonly employed in the art.

A "contact lens" refers to an object that can be placed on or within a wearer's eye. A contact lens can correct, improve, or alter a user's eyesight, but that need not be the case. A contact lens can be of any appropriate material known in the art or later developed, and can be a soft lens, a hard lens, or a hybrid lens. A contact lens can be tinted before printing any color patterns. A contact lens can be in a dry state or a wet state. "Dry State" refers to a soft lens in a state prior to hydration or the state of a hard lens under storage or use conditions. "Wet State" refers to a soft lens in a hydrated state.

A "functional contact lens" refers to a contact lens containing at least one sensing element at least one target analyte or physical attribute, at least one electronic component selected from a group consisting of an antenna, a power supply, a control circuit, a microprocessor, a diode, an actuator and combinations thereof to perform diagnostic activities or vision correction for a contact lens wearer.

Mask refers to hide or conceal electronic components of the functional contact lens from view with a cosmetic pattern at least 70%, preferably 80%, more preferably 90% and even more preferably 95%.

The "front or anterior surface" of a contact lens, as used herein, refers to the surface of the lens that faces away from the eye during wear. The anterior surface, which is typically substantially convex, may also be referred to as the front curve of the lens.

The "rear or posterior surface" of a contact lens, as used herein, refers to the surface of the lens that faces towards the eye during wear. The rear surface, which is typically substantially concave, may also be referred to as the base curve of the lens.

A "colored contact lens" or "cosmetic contact lens" refers to a contact lens (hard or soft) having a color image pattern printed thereon. A color image can be a cosmetic pattern, for example, iris-like patterns, Wild Eye™ patterns, made-to-order (MTO) patterns, and the like; an inversion mark that allows a user to handle and insert easily a contact lens; a toric rotation mark, or contact lenses stock keeping units (SKUs), for example, either in forms of numbers or as bar codes. A color image can be a single color image or a multi-color image. A color image is preferably a digital image, but it can also be an analog image.

The term "eye color" refers to the color of the iris.

The term "ordinary viewer" is intended to mean a person having normal 20/20 version standing about 5 feet from a person wearing the lenses of the invention.

The term "non-opaque" as used herein is intended to describe transparent or translucent color or a part of the lens that is uncolored or colored with transparent or translucent coloring.

A "colored coat" refers to a coating on an object and having a color image printed therein.

A "colorant" means either one or more dyes or one or more pigments or a mixture thereof that is used to print a pattern of colored elements on a contact lens.

"Dye" means a substance that is soluble in a solvent and that is used to impart color. Dyes are typically transparent or translucent and absorb but do not scatter light. Dyes can cover both optical regions of contact lenses and non-optical regions of contact lenses.

A "pigment" means a powdered substance that is suspended in a liquid in which it is insoluble. Pigments are used to impart color. Pigments, in general, are more opaque than dyes.

The term "a conventional or non-pearlescent pigment" as used herein is intended to describe any absorption pigments that impart color based on the optical principle of diffuse scattering and its color is independent of its geometry. While any suitable non-pearlescent pigment may be employed, it is presently preferred that the non-pearlescent pigment is heat resistant, non-toxic and insoluble in aqueous solutions. Examples of preferred non-pearlescent pigments include any colorant permitted in medical devices and approved by the FDA, such as D&C Blue No. 6, D&C Green No. 6, D&C Violet No. 2, carbazole violet, certain copper complexes, certain chromium oxides, various iron oxides, phthalocyanine green, phthalocyanine blue, titanium dioxides, etc. See Marmiom DM Handbook of U.S. Colorants for a list of colorants that may be used with the present invention. A more preferred embodiment of a non-pearlescent pigment include (C.I. is the color index no.), without limitation, for a blue color, phthalocyanine blue (pigment blue 15:3, C.I. 74160), cobalt blue (pigment blue 36, C.I. 77343), Toner cyan BG (Clariant), Permajet blue B2G (Clariant); for a green color, phthalocyanine green (Pigment green 7, C.I. 74260) and chromium sesquioxide; for yellow, red, brown and black colors, various iron oxides; PR122, PY154, for violet, carbazole violet; for black, Monolith black C-K (CIBA Specialty Chemicals).

An "uneven or jagged or irregular border or peripheral edge" as used herein refers to a border or a peripheral edge on which positions have radial distances (i.e., from the lens center) which differ from each other by at least about 10%. A "substantially even border or peripheral edge" as used herein refers to a border or a peripheral edge on which positions have substantially constant radial distances (i.e., from the lens center), namely differing from each other less than 10%.

"Pearlescence" means having a pearly luster; resembling a pearl in physical appearance; or a color having a shiny, slightly reflective appearance.

A "pearlescent pigment" refers to a class of interference (effect) pigments, which are transparent thin platelets of low refractive index material (e.g., transparent mica platelets) coated with optically thin coating of a high refractive index material (e.g., metal oxide, such as, for example titanium oxide or iron oxide), and which impart color mainly based on the optical principle of thin-film interference. The optically thin coating of metal oxide can be comprised of single or multiple thin layers of metal oxide. Optically thin coatings applied to the platelets contribute interference effects, which allow the appearance to vary depending upon illumination and viewing conditions. The color is determined by the coating thickness, the refractive index and the angle of illumination. Optically thin coatings are also responsible for the rich, deep, glossy effect due to partial reflection from the metal oxide and partial transmission through the mica platelets. This class of pigment can provide pearly luster and iridescent effects.

Pearlescent pigments which are mica platelets with an oxide coating are commercially available from by the Englehard Corp. of Iselin, N.J., under the "Mearlin Pigment" line, such as "Hi-Lite Interference Colors," "Dynacolor Pearlescent Pigments", "MagnaPearl", "Flamenco," and "Celini Colors." Additional manufacturers of pearlescent colorants are: Kemira, Inc. in Savannah, Georgia, the pigments having the trade name "Flonac Lustre Colors"; and EM Industries, Inc. of Hawthorne, N.Y., the pigments having the trade name "Affair Lustre Pigments".

The term "pearlescently colored" as used herein is intended to describe an element of a colored pattern that is colored with a pearlescent colorant (i.e., containing at least one pearlescent pigment).

In the case of pearlescent pigments, it is important during processing to minimize platelet breakage and maintain a sufficient level of dispersion. Pearlescent pigments require gentle handling during mixing and they should not be ground, or subjected to prolonged mixing, milling or high shear since such operations can damage the pigments. Particle size distribution, shape and orientation strongly influence final appearance. Milling, high shear mixing or prolonged processing of pearlescent pigments should be avoided since such operations might lead to delamination of metal oxide coated layer, fragmentation of platelets, platelet agglomeration and platelet compaction. Delamination of metal oxide, compaction, fragmentation and agglomeration will reduce pearlescent effects.

The term "shining effect" as used herein is intended to describe the effect that the amount of pearlescent pigment is high enough to provide eye appearance of reflection with a sparkling luster.

"Hydrogel" means a cross-linked polymer having an equilibrium content between about 10 and 90 percent water.

A "lens-forming material" refers to a polymerizable composition which can be can be (cured (i.e., polymerized and/or crosslinked) thermally or actinically (i.e., by actinic radiation) to obtain a crosslinked polymer. Examples of actinic radiation are UV irradiation, ionized radiation (e.g. gamma ray or X-ray irradiation), microwave irradiation, and the like. Thermal curing or actinic curing methods are well known to a person skilled in the art. Lens-forming materials are well known to a person skilled in the art.

In general, the invention is directed to a cosmetic functional contact lens. It is discovered that the colored lens technology can be used to print over the electronic components to provide a more natural looking appearance. Different designs could be used to either mask the electronic components, or use the electronic components as part of the design. The print could either be on the same layer as the electronic component, or be placed over or beneath the electronic component layer to provide the overall desired aesthetics.

According to this invention, a print cosmetic pattern masks the abnormal appearance from the viewer over iris section by adding a composite pattern by overlaying pattern of a "starburst pattern" and a "limbal ring pattern". According to this invention, another cosmetic pattern further masks the abnormal appearance from the viewer over iris section to improve the functional contact lens wearer's eye appearance by adding a sunflower pattern.

It is discovered that such undesirable effects are reduced or eliminated by applying a cosmetic pattern to the functional contact lens to cover over the iris section. The ray cosmetic pattern masks the abnormal appearance from the viewer caused by functional elements such as electronic components, sensing elements, or an antenna and providing the wearer's natural eye appearance by blending in the wearer's natural eye colors with the colored, printed, opaque, intermittent cosmetic pattern of iris section.

According to the present application, a colored, printed, opaque, intermittent cosmetic pattern to mask the embedded electronic components, wherein the cosmetic pattern comprising a limbal ring pattern of a first color, a starburst pattern of a second color, wherein the first color and the second color are different or same, wherein limbal ring pattern and the starburst pattern have a substantially identical outer diameter wherein the limbal ring pattern, the starburst pattern are concentric with the center of the function contact lens. The cosmetic pattern further comprising a sunflower pattern of a third color, wherein the third color is different from the first color and the second color, wherein the sunflower pattern has a larger inner diameter than that of the limbal ring, wherein the sunflower pattern, the limbal ring pattern and the starburst pattern are concentric with the center of the function contact lens A first cosmetic pattern (i.e. limbal ring) of a first color and have evenly spaced circular voids. This limbal ring covers wearer's limbus and make his/her eye appears bigger while masking the functional elements of the functional contact lens. A second cosmetic pattern (i.e. starburst pattern) of a second color. The first color and the second color may be same or different. The limbal ring and starburst pattern can be many colors, for example, black, gray, brown and blue.

Limbal ring is intended to mean an annular band of color that, when the lens is on-eye and centered, partially or substantially completely overlies the lens wearer's limbus area. The limbus area is the area of the eye located between the iris area and the sclera area. Preferably, the limbal ring substantially completely overlies the limbus area. The innermost border, or edge closest to the geometric center of the lens, of the limbal ring may be about 5 mm to the outermost border to be about 12 mm, preferably about 6 to about 11.5 mm, even more preferably about 9 to about 11 mm, from the lens' geometric center. The ring may be of any suitable width and preferably is about 0.5 to about 2.5 mm in width, more preferably about 0.75 to about 1.75 mm in width, or even more preferably about 0.8 to about 1.25 mm in width.

The limbal ring surrounds an outer starburst pattern, wherein the limbal ring is comprised of a colorant, wherein the limbal ring has an interior peripheral edge and an exterior peripheral edge, wherein the exterior peripheral edge is substantially even, wherein the interior peripheral edge is uneven (or jugged or irregular) or substantially even.

The interior peripheral edge of a limbal ring refers to an edge being closest to the center of the colored lens. The exterior peripheral edge of a limbal ring refers to an edge being farthest from the center of the colored lens. The limbal ring partially or substantially completely overlies a lens wearer's limbal region when the lens is on-eye.

The limbal ring and the starburst can be comprised of any shaped pigmented areas, preferably, opaque dots. Preferred the limbal ring comprised of evenly spaced circular voids.

Sunflower: The large radiant flowers punctuate the tops of long erect stems, with yellow ray flowers and brownish purple disk flowers.

Sunflowers are a member of the aster family. The large flower head is actually an inflorescence, or composite flower, made up of two kinds of tiny florets. The disc florets are located in the center of the composite flower, and the ray florets bear the outer ring of petal-like structures. According to the present application, Sunflower cosmetic pattern refers to the ray florets bear the outer ring of petal-like structures since the center portion of the contact lens corresponding to the pupil section of wearer's eye needs to be clear for viewing. The sunflowers have the most petals among common flowers. Those sun flowers can vary in the number of petals, even within a species, but ten-twelve is a common number. However, according to the present application, the number of petals of the sunflowers is not limited to ten-twelve and can change in a wide range five to twenty, depending on The contrast of a limbal ring pattern and starburst pattern colored background will make the colors of the sunflower color patterns more vibrant and more evident on the final lens, without losing the natural pattern. The sunflower colored pattern may have a radial gradient of color intensity in which the color intensity changes from light to dark in a radial direction from the inner perimeter of the sunflower iris section to the outer perimeter of the sunflower iris section. The sunflower colored pattern may also may have a radial gradient of color intensity in which the color intensity changes from dark to light in a radial direction from the inner perimeter of the sunflower iris section to the outer perimeter of the sunflower iris section, depending on the arrangement of the functional elements and how sunflower pattern is able to mask functional elements of the contact lens. The sunflower color pattern may be composed of opaque colored dots of various sizes with varying amounts of space between them on the annular iris section of a contact lens. Sizes of the dots and/or amounts of space between the dots are controlled in a radially-controlled manner so that colored dot coverage increases in a radial direction from the inner perimeter of the sunflower iris section to the outer perimeter of the sunflower iris section. There are fewer or smaller colored dots spaced far apart as approaching the inner perimeter of the sunflower iris section of the color disk whereas there are more or larger black dots with closer spacing when approaching the outer perimeter of the sunflower iris section of the color disk. In some case, the arrangement of dots of various sizes with varying amounts of space between them on the annular can be reversed. Furthermore, the sunflower color pattern may be composed of same size with same amount of space between them. In another word, the sunflower pattern may be a uniform dots pattern, wherein the uniform dots pattern has both the sizes of the dots and the amounts of space between two dots being constant. What about irregular non-circular dots? Long lines?

The invention provides a cosmetic functional contact lens having a pupil section, a generally annular iris section surrounding the pupil section for detecting at least one target analyte or physical attribute, comprising:

a substrate for supporting electronic components and providing structural support for the functional contact lens;

at least one sensing element disposed on the substrate for sensing the at least one target analyte or physical attribute;

at least one electronic component selected from a group consisting of an antenna, a power supply, a control circuit, a microprocessor, a diode, an actuator and combinations thereof;

a colored, printed, opaque, intermittent cosmetic pattern to mask the embedded electronic components, wherein the cosmetic pattern comprising a limbal ring pattern of a first color, a starburst pattern of a second color, wherein the first color and the second color are different or same, wherein limbal ring pattern and the starburst pattern have a substantially identical outer diameter wherein the limbal ring pattern, the starburst pattern are concentric with the center of the function contact lens.

In a broad aspect, at least one embodiment described herein provides a Functional Contact Lens (FCL) for detecting at least one target analyte or physical attribute, comprising a substrate for supporting electronic components and providing structural support for the functional contact lens; at least one sensing element disposed on the substrate for sensing the at least one target analyte and undergoing a physical change representing a sensed signal; and an antenna disposed on the substrate for transmitting the sensed signal to an external device, the antenna being coupled to the at least one sensing element. For example, a functional contact lens (FCL) is described in US 2017/0042480 A1, herein incorporated by reference in its entirety. In addition, functional contact lenses are described in U.S. Pat. Nos. 7,490, 936, 8,154,804, 8,446,341, 8,740,996, 8,985,763, 9,050,185, 9,176,332, 9,320,460, 9,523,865, 9,696,564, US2014/0000101, US2016/0091737, US2017/0042480, US2018/0143454, CN103935057A. For each above mentioned patents or patent applications, herein incorporated by reference in its entirety.

To be directly in contact with a user's interstitial fluid such as the basal tear, for example, the FCL may be placed onto the eye, either on top of the cornea or in the conjunctive sac. Target biomarkers, after diffusing through various layers of the FCL, may come in contact and react with sensing module elements of the FCL, which will generate electrical signals. These signals may be processed by processing elements in the FCL, such as integrated circuits (ICs), and the processed signals or other related information may be transmitted by antenna situated in the FCL to an external transceiver-reader.

The external transceiver-reader device may receive and store information sent from the FLC and/or relay the information to an external processing device such as, but not limited to, a cellphone, a computer, an infusion pump, or any other suitable type of smart electronic devices. Information may then be processed further and stored in secure locations.

In some embodiments, the FCL may directly communicate with the external processing device, provided the external processing device can receive and process the transmitted information and, in some embodiments, provide power to the FCL wirelessly. One example of such a device is a smart phone with a near field communication (NFC) antenna and battery. The smart phone will be able to wirelessly transmit power to the FCL via inductive coupling at NFC frequencies, and at the same time, receiver biomarker profile information from the FCL.

Alternatively, the FCL may incorporate energy harvesting units such as fuel cells, solar cells, or electromechanical cells such as piezo electric cells. The energy generated by the energy harvesting unit may be stored in one of a capacitor, a super-capacitor, or a battery, and used to power other electronic components in the FCL system.

FIG. 1 as an example illustrates a prior art a functional contact lens (FCL) from US 2017/0042480 A1, herein incorporated by reference in its entirety, shown a top view of an example embodiment of an annular FCL 2. The FCL 2 comprises a first member 10, a second member 12, and a substrate 14 that may be used to provide support for the components of an antenna 16, sensing structures 20, 24 and 26, interconnects 28 and processing units 30, 32 and 34. The region 36 (pupil section or optical zone) is free from components and provides a visual pathway for the user's eye so that the user can see the surrounding environment.

The first member 10 is an outer ring or annulus that extends along the outer periphery of the FCL 2 and the second member 12 has a disc-shape that is encircled and touches the first member 10. Together the first and second members 10 and 12 provide a bottom portion of the housing for the FCL 2. The boundary between the first and second members 10 and 12 may be determined based on desired comfort levels, usage cases, and properties of the user's eye rather than the location of the electronic components.

The first and second members 10 and 12 may be made from the same or different materials, based on a desired usage of the FCL 2. For example, for users who wear the FCL during sleep, at least one of the first and second members 10 and 12 may be made from gas permeable contact lens materials such as, but not limited to, silicon elastomers, for example. For daytime wear, at least one of the first and second members 10 and 12 may be made using a soft hydrogel contact lens material having a high water content, for example.

The substrate 14 is another ring having a 3D volume that is disposed on top of the second member 12. The substrate 14 supports the electronic components 16, 18, 20, 24, 26, 28, 30, 32 and 34 of the FLC 2 and provides structural support for the functional contact lens.

The antenna 16 may comprise one or more loops. When the antenna 16 is multi-layered, then vias or through-holes 18 may be used to vertically physically couple portions of the antenna 16 that are on different layers of the substrate 14. Depending on the number of layers that are used for the antenna 16, different antenna designs may incorporate different locations, numbers and sizes of the through-holes.

The sensing structure 20 is an example of a biosensor which may be an artificial enzymatic biosensor or an artificial non-enzymatic biosensor.

A sensor module (i.e. biosensor module) for the FCL 2 includes all of the sensors 20 (i.e. biosensors 20) along with multiple electrodes that facilitate electrochemical reactions with various desired target species, or measure physical attribute (i.e. pressure, temp. light intensity). The overall shape of the biosensor module may be, but is not limited to, annular, polygonal or fractal, for example. The shape of the biosensor module may be determined based on a desired surface area that will be used as active detection sites for the biosensors 20. In some embodiments, the biosensors 20 may reside on multiple vertical layers of the substrate 14.

The biosensor module also includes a plurality of interconnects 24, only one of which is labeled for simplicity. The interconnect 24 may be used to physically and electrically couple the processing units 30, 32 and 34 with the biosensor module. In some embodiments, interconnects 24 may also be used to house the working electrodes for each biosensor.

The biosensor module may also include a plurality of interconnects 26, only one of which is labeled for ease of illustration, for physically and electrically connecting two or more biosensors together. Interconnects 26 may be used to house at least one of counter electrodes, reference electrodes, modulating electrodes, and cleansing electrodes, which may be shared amongst two or more biosensors 20.

Interconnects 28, only one of which is labeled for ease of illustration, may be used to couple the processing units 30, 32 and 34 with the antenna 18.

The processing units 30, 32 and 34 may be integrated circuits or other suitable micro or nano electronics. The processing unit 30 may comprise various electronic components including one, many, or all of a communication module (not shown), a power module (not shown), and the interface circuits that provide interfaces between sensing and/or optical modules, the communication module and the power module. The processing unit 34 may comprise a separate sensor interface integrated circuit, which may contain the interface circuit for one, several or all of the biosensors in the biosensing module. The processing unit 32 may be a separate power integrated circuit that may be used to couple with the power module (not shown). The power integrated circuit may comprise energy storage units such as at least one capacitor, at least one super-capacitor, at least one battery cell, power electronics, and/or one or more energy harvesting elements such as at least one fuel cell, at least one solar cell, at least one piezoelectric cell or a combination thereof.

In some embodiments, the biosensors used by any FCL described herein may include functional hydrogel layers having micro-hydrogel particles that may qualitatively detect the presence of target analytes. These types of biosensors may be functionalized with single-strain DNAs or specific antibodies coded with fluorophores so that upon target analyte binding with the biosensor, a fluorescent signal may be generated and outputted.

In some embodiments, the sensors used in any FCL described herein may monitor the local environment of the FCL continuously, periodically or intermittently by measuring certain physical attributes such as temperature, ocular pressure and light intensity.

Target biomarkers or target analytes that may be sensed by the biosensors used in the FCLs described herein may be molecules that are within the precorneal tear, such as acids, ions, carbohydrates, mucins, proteins, enzymes, lipids, antigens, hormones, nucleic acids, small molecules, medications and recreational drugs, for example. Acids and their conjugate bases of interest may include ascorbic acid/ascorbate carbonic acid/carbonate, lactic acid/lactate, pyruvic acid/pyruvate and uric acid/urate, for example. Ions of interest include calcium, potassium, sodium, and magnesium, for example. Carbohydrates of interest may include fructose, glucose, sucrose, glactose, maltose, and lactose, for example. Proteins of interests may include lysozyme, lipocalin, tear-specific pre-albumin (TSP), cytokine (tumor necrosis factors, TNF).

Figure 2:
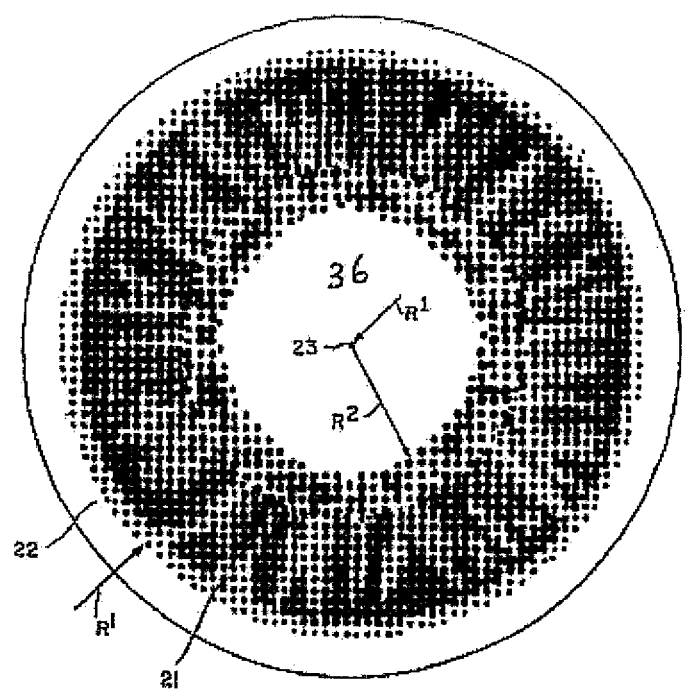
FIG. 2 illustrates a prior art cosmetic contact lens.

FIG. 2 as an example illustrates a prior art cosmetic contact lens. It has a non-opaque pupil section 36 in the center of lens, and an annular iris section 21 surrounding the pupil section. For hydrophilic lenses, a transparent peripheral section 22 surrounds iris section 21. A colored, opaque, intermittent pattern is located over the entire iris section 21, as show in FIG. 1. The pattern leaves a substantial portion of the iris section within the interstices of the pattern non-opaque. The non-opaque areas of iris section 21 appear white in FIG. 2.

Figure 3:
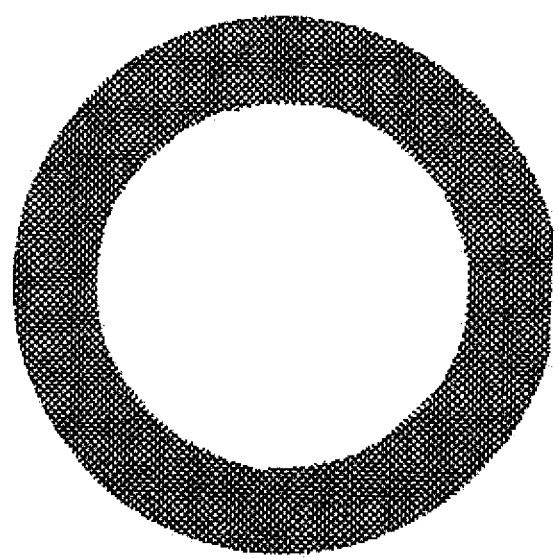
FIG. 3 illustrates a "limbal ring with evenly spaced circular voids" in accordance with the present invention.

The limbal ring pattern is shown in FIG. 3 with evenly spaced circular voids" in accordance with the present invention, black, gray, brown and blue is most often used as the color of the limbal ring.

Figure 4:
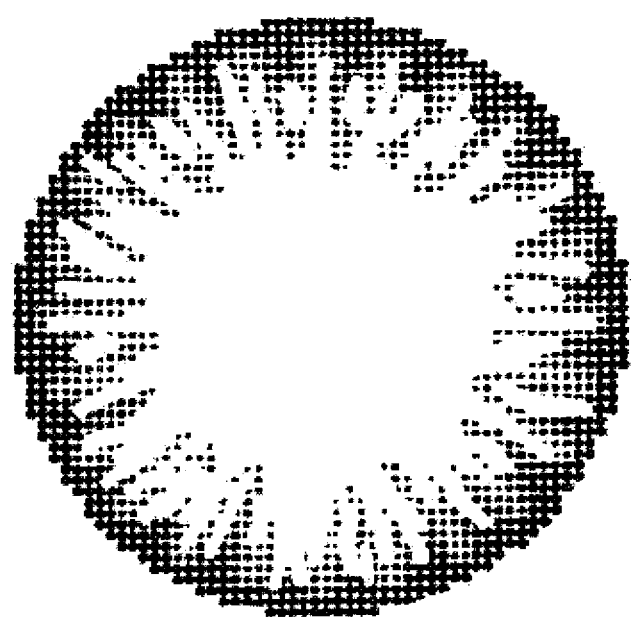
FIG. 4 illustrates a "starburst pattern" in accordance with the present invention.

The starburst pattern is shown in FIG. 4. black, gray, brown and blue is most often used as the color of the starburst pattern. The limbal ring pattern and the starburst pattern have the same color or a different color.

Figure 5:
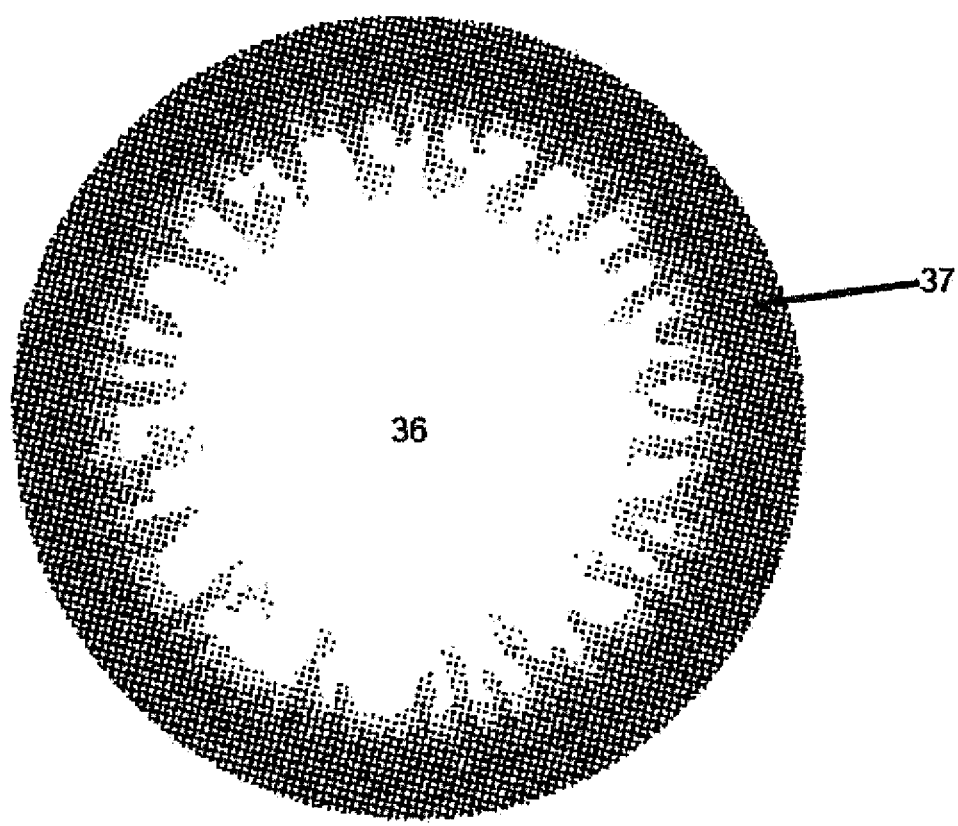
FIG. 5 illustrates the composite pattern by overlaying pattern of a "starburst pattern" and a "limbal ring pattern" in accordance with the present invention.

The composite pattern (37) by overlaying pattern of a "starburst pattern" and a "limbal ring pattern" is shown in FIG. 5.

Figure 6:
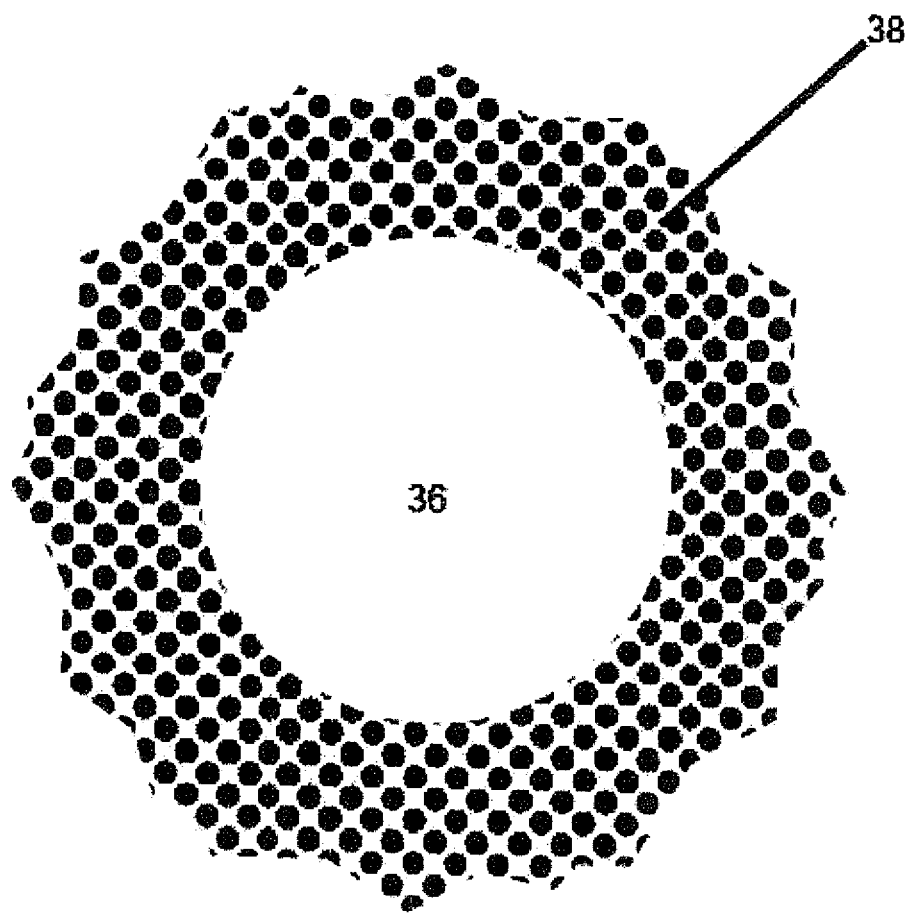
FIG. 6 illustrates a "sunflower pattern" has a uniform dots pattern, wherein the uniform dots pattern has both the sizes of the dots and the amounts of space between two dots being constant.

The sunflower pattern (38) is shown in FIG. 6 and can be many colors, for example hazel, yellow, yellow green, gold, gray, turquoise, violet, aqua, and green. FIG. 6 illustrates the sunflower pattern has a uniform dots pattern which has both the sizes of the dots and the amounts of space between two dots being constant. Please note that the sunflower pattern (not shown) may has a gradient dots pattern, wherein the gradient dots pattern has both the sizes of the dots and the amounts of space between two dots are varied in a way that the size of each dot increases gradually whereas the amount of space between dots decreases gradually in the radial direction toward the center of functional contact lens. Furthermore, the sunflower pattern may also have a gradient dots pattern (not shown), wherein gradient dots pattern has both the sizes of the dots and the amounts of space between two dots are varied in a way that the size of each dot decreases gradually whereas the amount of space between dots increases gradually in the radial direction toward the center of functional contact lens. Alternately, the elements that compose the sunflower shape could be composed of other shapes than a circle (i.e. squares, triangles, ellipses, or irregular shapes)

Figure 7:
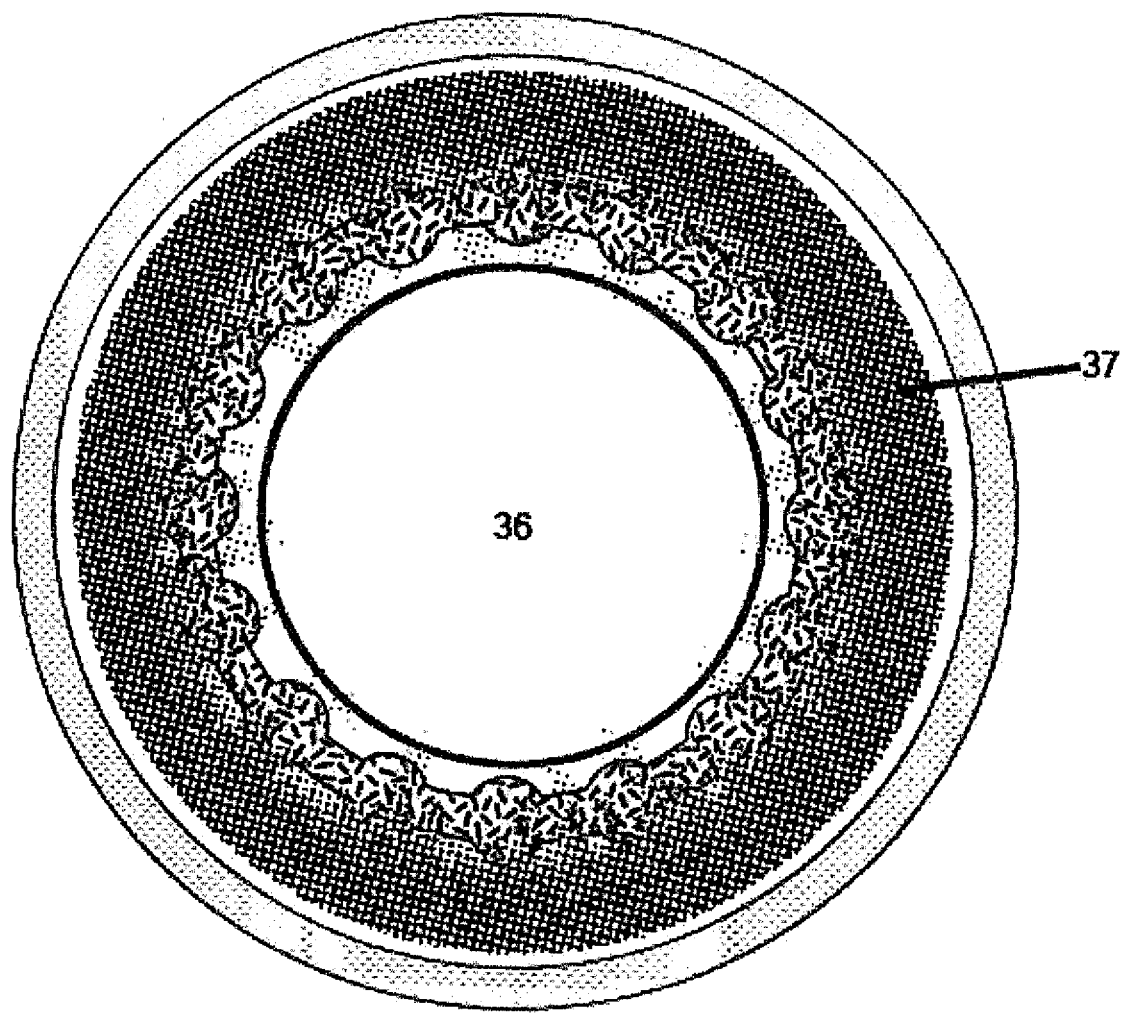
FIG. 7 illustrates a Functional Contact Lens (FCL) with the overlay pattern of a "starburst pattern" and a "limbal ring pattern" in accordance with the present invention.
Figure 8:
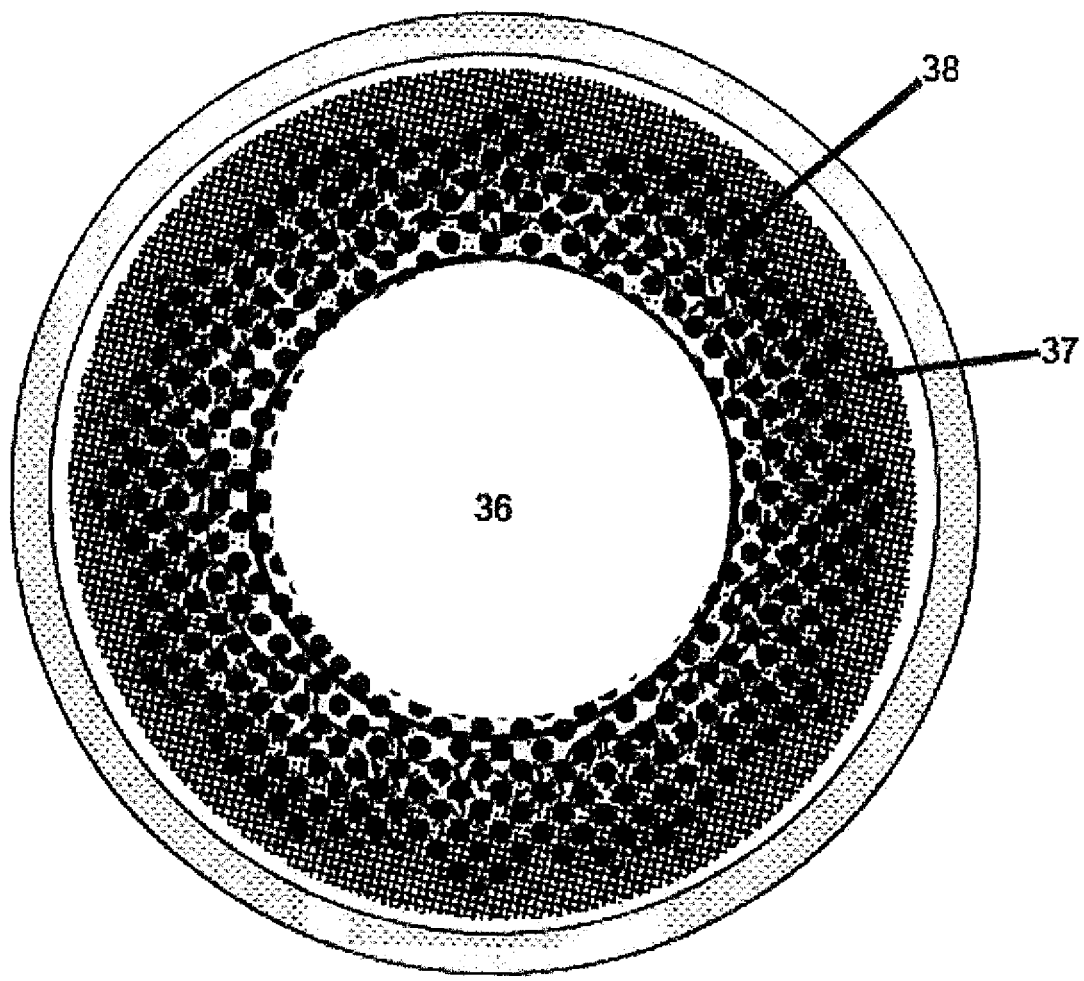
FIG. 8 illustrates a Functional Contact Lens (FCL) with the "outer composite pattern" of FIG. 5 and the "Inner sunflower pattern of FIG. 7

FIG. 7 illustrates a Functional Contact Lens (FCL) with the overlay pattern (37) of a "starburst pattern" and a "limbal ring pattern" in accordance with the present invention;

FIG. 8 illustrates a Functional Contact Lens (FCL) with the "outer composite pattern" of FIG. 5 and the "Inner sunflower pattern of FIG. 6. FIG. 8. Illustrates the cosmetic pattern comprising a limbal ring pattern of a first color, a starburst pattern of a second color and a sunflower pattern of a third color, wherein the first color and the second color are different or the same, the third color is different from the first color and the second color, wherein limbal ring pattern and the starburst pattern have a substantially identical outer diameter and the sunflower pattern has a larger inner diameter than that of the limbal ring, wherein the limbal ring pattern, the starburst pattern and the sunflower pattern are concentric with the center of the function contact lens.

An ink for printing a colored lens of the invention can be prepared according any known suitable methods. For example, first a solution of binding polymer and solvent is prepared and this solution is mixed with paste containing the colorant to form an ink.

Pad transfer printing is well known in the art (see. For example, U.S. Pat. No. 3,536,386 to Spivack; U.S. Pat. Nos. 4,582,402 and 4,704,017 to Knapp; U.S. Pat. No. 5,034,166 to Rawlings et al., herein incorporated by reference in their entireties). A typical example of this printing follows. An image is etched into metal to form a cliche. The cliche is placed in a printer. Once in the printer, the cliche is inked by either an open inkwell doctoring system or by a closed ink cup sliding across the image. Then, a silicone pad picks up the inked image from the cliche and transfers the image to the contact lens. The silicone pads are made of a material comprising silicone that can vary in elasticity. The properties of the silicone material permit the inks to stick to the pad temporarily and fully release from the pad when it contacts a contact lens or a mold. Appropriate pad-transfer printing structures include, but are not limited to, Tampo-type printing structures (Tampo vario 90/130), rubber stamps, thimbles, doctor's blade, direct printing, or transfer printing as they are known in the art.

Any known suitable silicone pad can be used in the present invention. Silicone pads are commercially available. However, different pads could give different print qualities. A person skilled in the art will know how to select a pad for a given ink.

Cliches can be made of ceramics or metals (e.g., steel). Where a cliche is made of a steel, it would be desirable to neutralize the pH of a water-based ink (e.g., adjusted pH to 6.8.about.7.8) by adding a buffer (such as, for example, phosphate salts). Images can be etched into a cliche according to any methods known to a person skilled in the art, for example, by chemical etching or laser ablation or the like. It is also desirable to clean cliches after use using standard cleaning techniques known to a person skilled in the art, such as, for example, immersion in a solvent, sonication, or mechanical abrasion.

It is understood that either the anterior (convex) or posterior (concave) surfaces of the lens may be printed, but printing the anterior surface is presently preferred.

Printing the lens using an inkjet printing process is described in published US Patent Application Nos. 2001/0050753, 2001/0085934, 2003/0119943, and 2003/0184710, herein incorporated by references in their entireties.

In accordance with a preferred embodiment, a colored contact lens may further comprise a clear coating covering at least the colored area of a lens. A clear coating can be formed on the colored area by applying a layer of a clear polymerizable solution free of any colorant onto the lens surface with color prints and then polymerizing the layer of clear polymerizable solution. A clear coat may minimize leaching of a colorant and may enhance wearer's comfort.

Alternatively, a colored contact lens of the invention can be made according to a print-on-mold process similar to those described in U.S. Pat. No. 5,034,166 to Rawlings et al. (herein incorporated by reference). An ink can be applied first on the molding surface of one or both mold portions by using pad transfer printing (or pad printing) or inkjet printing to form a colored coat (with a color image). A colored coat can be applied on the molding surface defining the posterior (concave) surface of a contact lens or on the molding surface defining the anterior surface of a contact lens or on both mold portions. Preferably, a colored coat (with a color image) is applied on the molding surface defining the anterior surface of a contact lens.

Optionally, a transferable coating can be applied to a molding surface of a mold before applying the ink by pad transfer printing. A transfer coating is intended to describe a coating which can be detached from a molding surface of a mold and become integral with the body of a contact lens molded in the mold. A transferable coating can be applied to a molding surface of mold by any suitable techniques, such as, for example, spraying, printing, swabbing, or dipping. A transferable coating can be prepared from a solution comprising polymerizable components and free of any colorants. For example, a transferable coating with substantially uniform thickness (less than 200 microns) can be prepared by spraying a molding surface with a solution having the composition (without colorant) of an ink to be used or a solution of prepolymer or a lens-forming material to be used. This transferable coating can optionally be dried or cured to form a transferable clear film (without any pigment but optionally with dyes including reactive dyes). One or more colored patterns can then be printed on this transferable coating or film. By applying a transferable coating before printing, one can make a colored lens in which printed colored patterns are embedded just below a film derived from the transferable coating. Such a lens may be more comfortable for wearing and have much less susceptibility to colorant leaching out of the colored lens.

After printing an ink of the invention on a molding surface of a mold, the printed ink can be cured by UV or other actinic radiation to form a colored film in accordance with the invention. It is desirable that the printed ink is cured actinically to an extent to minimize loss of pattern definition of the colored coat resulted from subsequent filling of a lens-forming material.

Lens molds for making contact lenses are well known to a person skilled in the art and, for example, are employed in cast molding or spin casting. For example, a mold (for cast molding) generally comprises at least two mold sections (or portions) or mold halves, i.e. first and second mold halves. The first mold half defines a first molding (or optical) surface and the second mold half defines a second molding (or optical) surface. The first and second mold halves are configured to receive each other such that a lens forming cavity is formed between the first molding surface and the second molding surface. The molding surface of a mold half is the cavity-forming surface of the mold and in direct contact with lens-forming material.

Methods of manufacturing mold sections for cast-molding a contact lens are generally well known to those of ordinary skill in the art. The process of the present invention is not limited to any particular method of forming a mold. In fact, any method of forming a mold can be used in the present invention. The first and second mold halves can be formed through various techniques, such as injection molding or lathing. Examples of suitable processes for forming the mold halves are disclosed in U.S. Pat. No. 4,444,711 to Schad; U.S. Pat. No. 4,460,534 to Boehm et al.; U.S. Pat. No. 5,843,346 to Morrill; and U.S. Pat. No. 5,894,002 to Boneberger et al., which are also incorporated herein by reference.

Virtually all materials known in the art for making molds can be used to make molds for making contact lenses. For example, polymeric materials, such as polyethylene, polypropylene, polystyrene, PMMA, Topas® COC grade 8007-S10 (clear amorphous copolymer of ethylene and norbornene, from Ticona GmbH of Frankfurt, Germany and Summit, N.J.), or the like can be used. Other materials that allow UV light transmission could be used, such as quartz glass and sapphire.

Any lens-forming materials can be used in the invention and is not presently considered a critical part of this aspect of the invention. Lens forming materials that are suitable in the fabrication of contact lenses are illustrated by numerous issued US patents and familiar to those skilled in the art. Preferred lens-forming materials are capable of forming hydrogels. A lens-forming material can comprise one or more prepolymers, optionally one or more vinylic monomers and/or macromers and optionally further include various components, such as photoinitiator, visibility tinting agent, fillers, and the like. It should be understood that any silicone-containing prepolymers or any silicone-free prepolymers can be used in the present invention.

An ink typically comprises at least one colorant, a binder polymer, and a solvent. An ink can optionally include a crosslinker, a humectant, a surfactant, a monomer, a polymerization initiator, an antimicrobial agent, an antioxidant agent, an anti-kogating agent, and other additives known in the art.

Although various embodiments of the invention have been described using specific terms, devices, and methods, such description is for illustrative purposes only. The words used are words of description rather than of limitation. It is to be understood that changes and variations may be made by those skilled in the art without departing from the spirit or scope of the present invention, which is set forth in the following claims. In addition, it should be understood that aspects of the various embodiments may be interchanged either in whole or in part. Therefore, the spirit and scope of the appended claims should not be limited to the description of the preferred versions contained therein.

EXAMPLES

Different colors of black, dark violet are prepared as shown in Table 1. The percentage of each component is by weight.

TABLE 1

| Ink | Black Nelfilcon[1] | iron oxide | Carbazole violet | PCN Blue | PCN green | Surfactant[2] | $Na_2PO_4$ | Irgacure® 2959 |
|---|---|---|---|---|---|---|---|---|
| BK-1 | 84.3 | 14.0 | | | | 0.1 | 0.2 | 1.4 |
| BK-2 | 89.8 | 7.0 | 1.5 | | | 0.1 | 0.2 | 1.4 |
| BK-3 | 89.8 | 7.0 | | 1.5 | | 0.1 | 0.2 | 1.4 |
| BK-4 | 90.7 | 6.5 | | 1.5 | | 0.1 | | 1.2 |
| BK-5 | 83.2 | 15.5 | | | | 0.1 | | 1.2 |

[1]An aqueous solution of nelfilcon (30% by weight of nelfilcon and 70% by weight of water)
[2]Surfynol® 420 surfactant Different colors of black, hazel and CB Blue are prepared as shown in Table 2. The percentage of each component is by weight.

TABLE 2

| Final Composition (for example only) | CB Blue | Hazel | Black |
|---|---|---|---|
| PCN Blue | 1.2% | 0.05% | 9.5% |
| PCN Green | | | |
| Titanium Dioxide | 5.8% | 0.5% | |
| Red Iron Oxide | | 1.3% | |
| Yellow iron Oxide | | 3.6% | |
| Black Iron oxide | | | |
| Binder (SiHy containing Binder) | 32% | 32% | 36% |
| PI/Darocure 4265 | 0.5% | 0.5% | 0.5% |
| Solvent/1-PrOH | 59% | 60% | 54% |

SiHy containing binder preparation is described in U.S. Pat. No. 7,550,519, herein incorporated by reference in its entirety.

What is claimed is:

1. A cosmetic functional contact lens having a pupil section, a generally annular iris section surrounding the pupil section for detecting at least one target analyte or physical attribute, comprising:
a substrate for supporting electronic components and providing structural support for the functional contact lens;
at least one sensing element disposed on the substrate for sensing the at least one target analyte or physical attribute and undergoing a physical change representing a sensed signal;
an antenna disposed on the substrate for transmitting the sensed signal to an external device, the antenna being coupled to the at least one sensing element;
a colored, printed, opaque, intermittent cosmetic pattern to mask the embedded electronic components, wherein the cosmetic pattern comprising a limbal ring pattern of a first color, a starburst pattern of a second color, wherein the first color and the second color are different or same, wherein limbal ring pattern and the starburst pattern have a substantially identical outer diameter wherein the limbal ring pattern, the starburst pattern are concentric with the center of the function contact lens, wherein the cosmetic pattern further comprising a sunflower pattern of a third color, wherein the third color is different from the first color and the second color, wherein the sunflower pattern has a larger inner diameter than that of the limbal ring, wherein the sunflower pattern, the limbal ring pattern and the starburst pattern are concentric with the center of the function contact lens.

2. The colored contact lens of claim 1, wherein the interior peripheral edge of the limbal ring is at a diameter of about 5 mm to about 12 mm from the lens' geometric center.

3. The colored contact lens of claim 2, wherein the interior peripheral edge of the limbal ring is at a diameter of about 6 mm to about 11.5 mm from the lens' geometric center.

4. The colored contact lens of claim 2, wherein the width of the limbal ring is about 0.5 mm to about 2.5 mm.

5. The colored contact lens of claim 1, the limbal ring pattern located near the peripheral edge of the starburst pattern, wherein the limbal ring has a substantially even exterior peripheral edge and a jagged or substantially-even interior peripheral edge.

6. The colored contact lens of claim 1, wherein the limbal ring pattern overlaps to some degrees with the starburst pattern.

7. The colored contact lens of claim 1, wherein the limbal ring pattern and the starburst pattern have a color selected from a group consisting of black, gray, brown and blue.

8. The colored contact lens of claim 1, wherein the sunflower pattern has a color selected from a group consisting of hazel, yellow, yellow green, gold, gray, turquoise, violet, aqua, and green.

9. The colored contact lens of claim 1, wherein the color of the limbal ring pattern and the starburst pattern are the same, wherein the limbal ring pattern and the starburst pattern have a color selected from a group consisting of black, gray, brown and blue.

10. The colored contact lens of claim 1, wherein the color of the limbal ring pattern and the starburst pattern are different, wherein the limbal ring pattern and the starburst pattern have a color selected from a group consisting of black, gray, brown and blue.

11. The colored contact lens of claim 1, the sunflower pattern is a uniform dots pattern, wherein the uniform dots pattern has both the sizes of the dots and the amounts of space between two dots being constant.

12. The colored contact lens of claim 1, the sunflower pattern has a gradient dots pattern, wherein the gradient dots pattern has both the sizes of the dots and the amounts of space between two dots are varied in a way that the size of each dot increases gradually whereas the amount of space between dots decreases gradually in the radial direction toward the center of functional contact lens.

13. The colored contact lens of claim 1, the sunflower pattern has a gradient dots pattern, wherein gradient dots pattern has both the sizes of the dots and the amounts of space between two dots are varied in a way that the size of each dot decreases gradually whereas the amount of space between dots increases gradually in the radial direction toward the center of functional contact lens.

14. The colored contact lens of claim 1, the sunflower pattern is located generally on the inside of and surrounded by the limbal ring pattern, wherein a jagged border separates the starburst pattern and the limbal ring pattern.

15. The colored contact lens of claim 1, the sunflower pattern comprises at least one pearlescent pigment in an amount sufficient to provide to the sunflower pattern of the functional contact lens a desirable amount of pearlescent to impart a shine appearance to blend in with the colors of the functional elements of the functional contact lens to wearer's eye.

* * * * *